US007594219B2

(12) United States Patent　　　　　　　　　　(10) Patent No.: US 7,594,219 B2
Ramachandran et al.　　　　　　　　　　　　　　(45) Date of Patent: Sep. 22, 2009

(54) METHOD AND APPARATUS FOR MONITORING COMPATIBILITY OF SOFTWARE COMBINATIONS

(75) Inventors: Puthukode G. Ramachandran, Austin, TX (US); John Conrad Sanchez, Pflugerville, TX (US); Lorin Evan Ullmann, Austin, TX (US); Mark Joseph Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 10/626,205

(22) Filed: Jul. 24, 2003

(65) Prior Publication Data

US 2005/0022176 A1　　Jan. 27, 2005

(51) Int. Cl.
　　*G06F 9/44*　　　(2006.01)
　　*G06F 9/445*　　(2006.01)
　　*G06F 9/00*　　　(2006.01)
(52) U.S. Cl. .................... 717/124; 717/121; 717/174; 713/100
(58) Field of Classification Search .............. 717/174
　　See application file for complete search history.

(56) References Cited

U.S. PATENT DOCUMENTS

| 4,558,413 | A |   | 12/1985 | Schmidt et al. ............ 364/300 |
| 5,339,435 | A |   | 8/1994 | Lubkin et al. .............. 395/700 |
| 5,675,802 | A |   | 10/1997 | Allen et al. ................. 395/703 |
| 5,694,540 | A |   | 12/1997 | Humelsine et al. ..... 395/183.14 |
| 5,787,280 | A |   | 7/1998 | Joseph et al. .............. 395/619 |
| 5,794,052 | A |   | 8/1998 | Harding ...................... 395/712 |
| 5,966,539 | A |   | 10/1999 | Srivastava .................. 395/709 |
| 6,063,134 | A |   | 5/2000 | Peters et al. ................. 717/11 |
| 6,073,109 | A | * | 6/2000 | Flores et al. ................... 705/8 |
| 6,195,765 | B1 |   | 2/2001 | Kislanko et al. .............. 714/38 |
| 6,199,204 | B1 | * | 3/2001 | Donohue .................... 717/178 |
| 6,202,207 | B1 | * | 3/2001 | Donohue .................... 717/173 |

(Continued)

FOREIGN PATENT DOCUMENTS

EP　　　　1164475 A2　　12/2001

(Continued)

OTHER PUBLICATIONS

"Tool to Facilitate Testing of Software to Insure Compatibility", Apr. 1988, IBM Technical Disclosure Bulletin. Retrieved by East Version 2.2.1.0 on May 20, 2008.*

(Continued)

*Primary Examiner*—Tuan Q Dam
*Assistant Examiner*—Thuy Dao
(74) *Attorney, Agent, or Firm*—Yee & Associates, P.C.; Libby Z. Handelsman

(57) ABSTRACT

The present invention provides a method, apparatus, and computer instructions for testing compatibility of software versions, the method comprising the computer implemented steps of performing an inventory on an existing set of software modules resident in the data processing system responsive to an installation of a new software module in a data processing system; referring to a knowledge base of versions of respective software modules to determine whether the new software module is compatible with the existing set of software modules; and testing the new software module in a test data processing system in combination with the existing set of software modules in response to a negative determination.

18 Claims, 5 Drawing Sheets

U.S. PATENT DOCUMENTS

| | | | |
|---|---|---|---|
| 6,425,118 B1 | 7/2002 | Molloy et al. | 717/4 |
| 6,438,743 B1 | 8/2002 | Boehm et al. | 717/122 |
| 6,453,468 B1 | 9/2002 | D'Souza | 717/168 |
| 6,457,170 B1 | 9/2002 | Boehm et al. | 717/106 |
| 6,477,703 B1 | 11/2002 | Smith et al. | 717/168 |
| 6,484,315 B1 | 11/2002 | Ziese | 717/173 |
| 6,501,995 B1 | 12/2002 | Kinney et al. | 700/1 |
| 6,513,045 B1 | 1/2003 | Casey et al. | 707/104.1 |
| 6,526,571 B1 | 2/2003 | Alzikowitz et al. | 717/154 |
| 6,735,757 B1 * | 5/2004 | Kroening et al. | 717/120 |
| 6,948,059 B1 * | 9/2005 | Sprecher et al. | 713/100 |
| 7,069,541 B2 * | 6/2006 | Dougherty et al. | 717/122 |
| 2002/0104042 A1 | 8/2002 | Wong et al. | 714/38 |
| 2003/0041096 A1 * | 2/2003 | Johnson | 709/201 |
| 2004/0128651 A1 * | 7/2004 | Lau | 717/124 |

FOREIGN PATENT DOCUMENTS

| | | |
|---|---|---|
| JP | 10083284 A | 3/1998 |
| JP | 10260820 A | 9/1998 |

OTHER PUBLICATIONS

"EDG testbed experience", M. Schulz, Oct. 2002, pp. 1-27. Online retrieved at <http://conferences.fnal.gov/lccws/papers2/tue/edgtestbmarkusfinal.pdf>.*

Carey et al., "The Architecture of the Exodus Extensible DBMS", 1986 IEEE, ACM Digital Library, pp. 52-65.

Kistler et al., "Continuous Program Optimization: A Case Study", ACM Transactions on Programming Languages and Systems, vol. 25, No. 4, Jul. 2003, 500-548.

* cited by examiner

|  | WAS 4.1 | WAS 5.0 |
|---|---|---|
| DB2 7.2 | OK, 15 OF 20 | OK, 5 OF 20 |
| DB2 7.1 | ? | NO |
| DB2 8.0 | ? | ? |

METHOD AND APPARATUS FOR MONITORING COMPATIBILITY OF SOFTWARE COMBINATIONS

BACKGROUND OF THE INVENTION

1. Technical Field

The present invention relates generally to an improved data processing system and in particular to a method and apparatus for processing data. Still more particularly, the present invention relates to a method, apparatus, and computer instructions for monitoring software combinations.

2. Description of Related Art

Software modules are often put together to form suites or packages. A software module is a self-contained software component that interacts with a larger system. Software modules are designed to handle a specific task within a larger program or suite of programs. For example, a software module may be a word processing program, a spreadsheet program, a filter, or a dynamic link library (DLL). Different software modules may provide different functionality in which the software modules in a suite or packages are able to easily interact or exchange data. Additionally, some software modules may provide library functions or filtering functions. Developers are constantly generating new versions of software. For example, a newer library or spreadsheet program may be developed for use with other software modules.

Typically, newer versions of software are often backwards compatible. For example, a newer spreadsheet program may generate files in a format that are not readable by an older version of that program. Oftentimes, the newer spreadsheet program reads files generated by the older version of the program. Although such an assumption is usually correct, this type of assumption cannot always be made. For most information technology environments, "usually correct" is unacceptable.

Determinations of compatibility are currently made by the administrators of networks. This situation also is unacceptable because of the reliance on the knowledge of the administrators. If an administrator is incorrect about the compatibility of an upgrade of a software module or an addition of a new software module to a set of software modules, errors or failures may occur.

Therefore, it would be advantageous to have an improved method, apparatus, and computer instructions for monitoring and testing software combinations.

SUMMARY OF THE INVENTION

The present invention provides a method, apparatus, and computer instructions for testing compatibility of software version, an inventory is performed on an existing set of software modules resident in the data processing system responsive to an installation of a new software module in a data processing system. A knowledge base of versions of respective software modules is referenced to determine whether the new software module is compatible with the existing set of software modules. The new software module is tested in a test data processing system in combination with the existing set of software modules in response to a negative determination.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
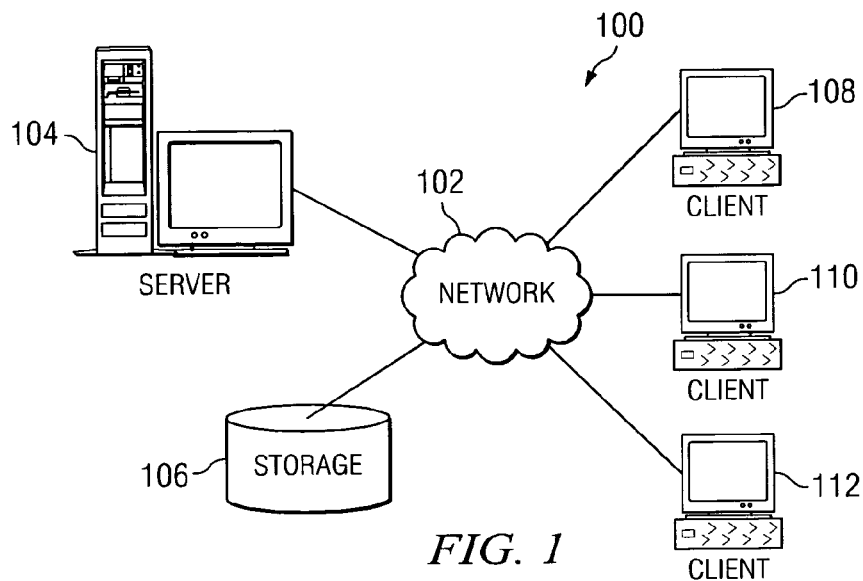
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
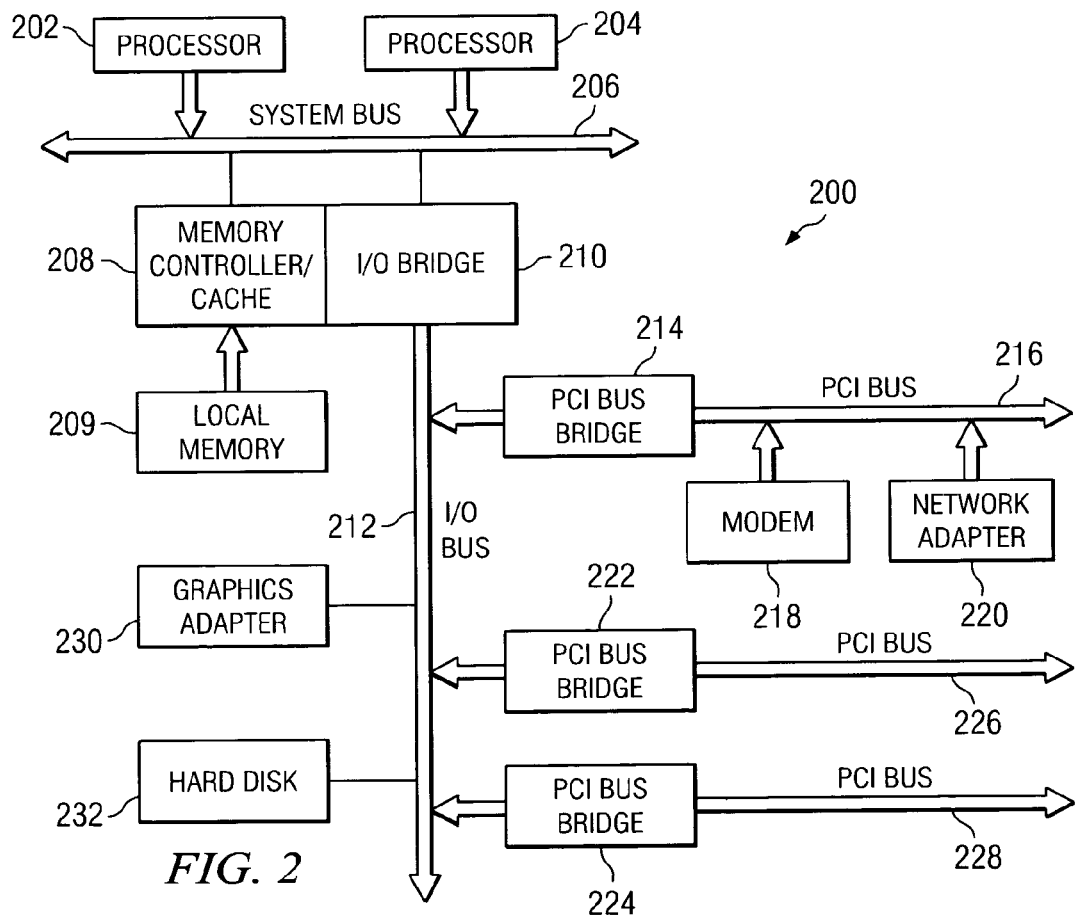
FIG. 2 is a block diagram of a data processing system that may be implemented as a server.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eSserver pSeries system, a product of International Business Machines Corporation in Armonk, N.Y., running the Advanced Interactive Executive (AIX) operating system or LINUX operating system.

Figure 3:
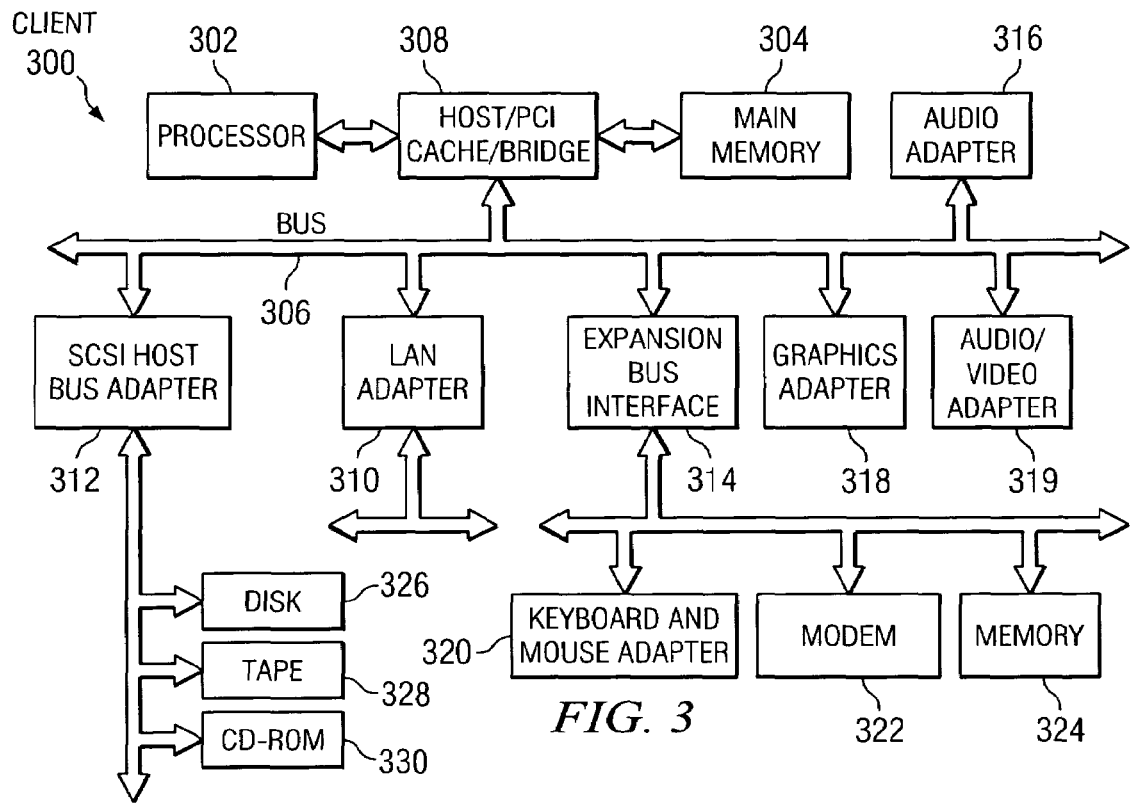
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a personal digital assistant (PDA). Data processing system 300 also may be a kiosk or a Web appliance.

The present invention provides a method, apparatus, and computer instructions for monitoring and testing software combinations. The mechanism of the present invention allows for users or customers who are adding or upgrading software modules to an existing set of software modules to determine whether compatibility problems are present.

Figure 4:
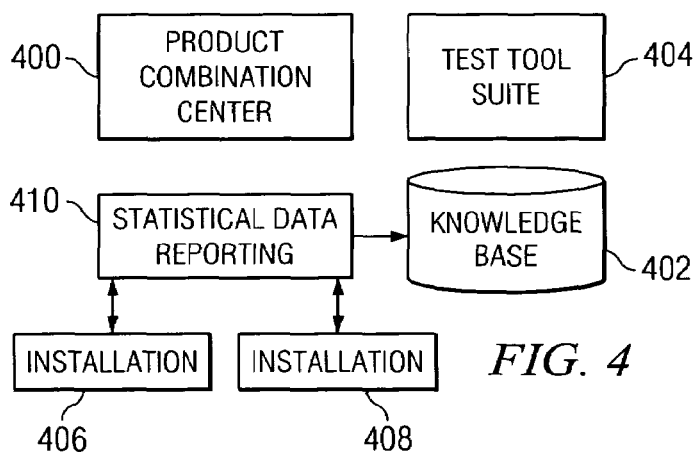
FIG. 4 is a diagram illustrating components used in monitoring software combinations in accordance with a preferred embodiment of the present invention.

Turning now to FIG. 4, a diagram illustrating components used in monitoring software combinations is depicted in accordance with a preferred embodiment of the present invention. Product combination center 400 may be implemented as a server process or a set of processes to provide software modules and installation of software modules to a customer. Product combination center 400 may be found on a server, such as server 104 in FIG. 1.

In this example, product combination center 400 may include binaries or executable code for software modules, as well as installation programs. When a client requests a software module, product combination center 400 provides an installation program to install the software module. This installation program may be sent directly to the client, may reside on the server, or a portion of the installation program may reside on the server while another portion is sent to the client.

The mechanism of the present invention may include processes in a program to determine whether a new software module may require testing. As used herein, a "new software module" is an additional software module not currently found in a set of software modules or replacement or upgrade software module, which replaces a software module currently found in a set of software modules on the client. An identification of whether a combination of software modules is compatible is stored in knowledge base 402. This knowledge base may be located in various locations such as on the same server as product combination 400 or on a different data processing system.

Knowledge base 402 in these examples is a database containing static and/or dynamic information regarding compatibility of combinations of software modules. This information may include, for example, prerequisites and co-requisites for different combinations of software modules. A prerequisite is a software component that is required to be installed and sometimes configured before target software component can be installed.

An example of a prerequisite is IBM® DB2®, a database required for running an IBM Directory application, which is available from International Business Machines Corporation. DB2 is a relational database product that manages all aspects of data such as, for example, replication, recovery, high speed access, and data administration. A co-requisite is a peer software component that is required to be installed in order for the target software component to be fully operational once it is installed. An example of co-requisite is two software programs that depend on each other such as two DLLs that use functionality from each other. Knowledge base 402 may reside in a variety of locations depending on the particular implementation. In these examples, knowledge base 402 resides on the same server as product combination 400.

If testing of a combination of software modules is required, this testing may be performed through test tool suite 404. Test tools are typically provided with the installation program in order to validate a program has been installed correctly. However, other test tools may validate that a program is configured and running correctly. These test tools may rely on customer specific test scenarios that exercise certain functions of the program. For example, a customer may be a set of validation tests that are run against a new product version before it is moved from the test environment to their production environment. If the customer has developed Java2 Platform, Enterprise Edition (J2EE) components that run on Websphere applications and support their external Web site, then these in-house applications are re-run on the a new version of a Web Application Server (WAS) before it is marked as compatible. Websphere applications, such as WAS, are available from International Business Machines Corporation. WAS is a J2EE application server that provides an operating environment for e-business applications that perform transactions over the internet.

In these examples, installation 406 and installation 408 are examples of software module installations undergoing testing. Monitoring of this testing may be performed through statistical data reporting 410, which may be located locally with installation 406 and installation 408. Although the installation and testing may occur on the client machines, these installations initially are performed on a test computer. In this manner, any errors or failures in compatibility testing do not affect the actual client.

Statistical data reporting 410 is a monitoring process used to determine whether the installations are running correctly. Monitoring of these installations may occur with the installation program on the test computer or another process on the test computer, sending back heartbeat information to indicate that a failure or error has not occurred with the combination. This data is sent to knowledge base 402 to provide additional statistical data for combinations being tested at installations 406 and 408. If the testing is successful or if knowledge base 402 indicates that the combination at the client results in absence of errors, the software module or software modules may then be installed at the client.

Figures 5, 6:
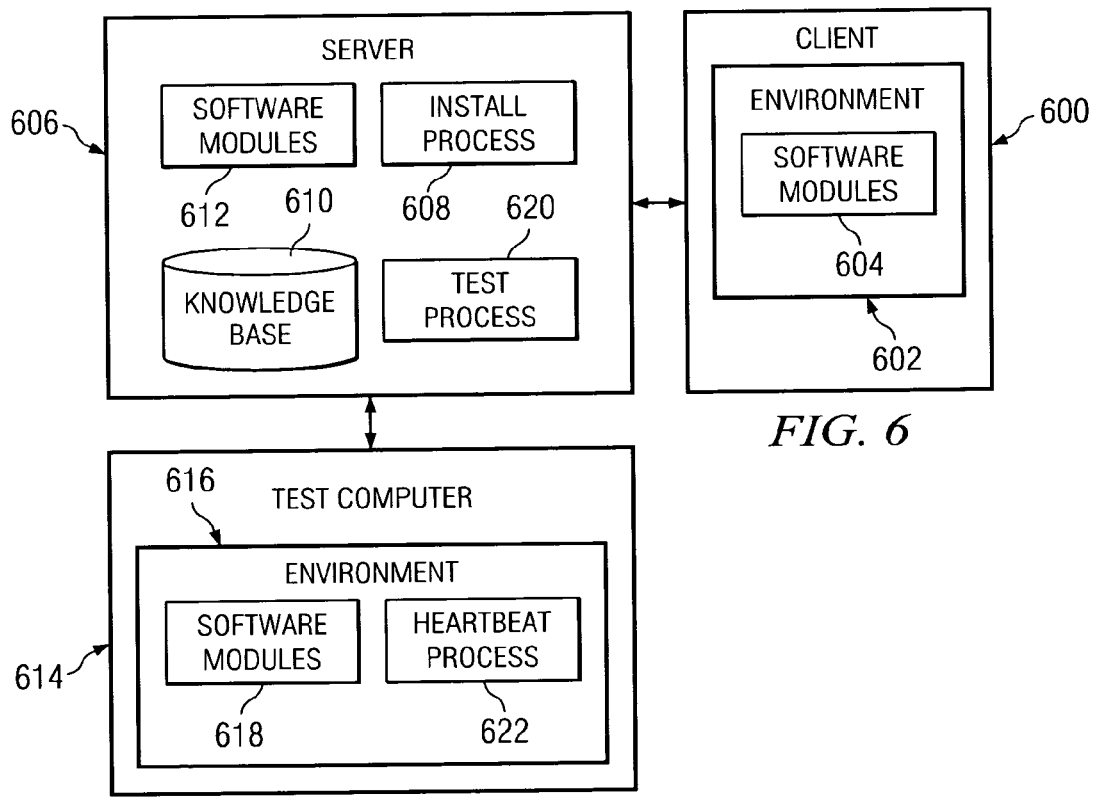
FIG. 5 is a diagram illustrating an install matrix in accordance with a preferred embodiment of the present invention.
FIG. 6 is a diagram of components used in monitoring and testing software modules in accordance with a preferred embodiment of the present invention.

With reference now to FIG. 5, a diagram illustrating an install matrix is depicted in accordance with a preferred embodiment of the present invention. Install matrix 500 is an example of static information that is present in knowledge base 402 in FIG. 4. As illustrated, install matrix 500 illustrates compatibility between different versions of two software modules installed on a data processing system.

Compatibility between DB2 and WAS is illustrated for different versions of these software modules in install matrix 500. As can be seen, entries 502, 504, and 506 indicate that no data is available for the proposed combination of software modules. Entries 508 and 510 in install matrix 500 indicated that the installations were "okay" in 15 of 20 and 5 of 20 installations, while entry 512 indicates of the combination that the installation was unsuccessful.

In the illustrated example, install matrix 500 shows a simple case of two types of software modules with different versions. Install matrices may include mode complex cases with more software modules.

Turning next to FIG. 6, a diagram of components used in monitoring and testing software modules is depicted in accordance with a preferred embodiment of the present invention. The components illustrated in FIG. 6 are those of a preferred implementation or embodiment of the present invention. Depending on the particular implementation, the components illustrated may have different configurations or locations.

Client 600 has environment 602, which includes the operating system, register settings, and other software configurations or settings. In this example, software modules 604 are present in environment 602. When a user or administrator desires to add another software module or upgrade a software module to a newer version in software modules 604, a request can be made to a server, such as server 606.

In response to receiving the request, server 606, initiates install process 608 to install the new software module. Install process 608 may reside entirely on server 606 or may be sent to client 600 for execution. Alternatively, a portion of install process 608 may reside on server 606, while another portion of install process 608 may be sent to client 600.

Install process 608 identifies software modules 604 and then queries knowledge base 610 to determine whether information is present regarding the combination of software modules. If knowledge base 610 indicates that the combination of software modules 604 with the new or upgrade version requested is positive then the installation of the new software module on client 600 continues. The new software module is obtained from software modules 612 on server 606.

In some cases, the combination of software modules for client 600 may include both successful and unsuccessful installs when a response is returned by knowledge base 610. In such a case, if the combination has been used before, but is risky, this fact may be presented to the user or customer to allow the user or customer to determine whether to install the new software module. In this case, the combination may be tested prior to installation on client 600. In addition, if knowledge base 610 contains no information about the combination, testing of the combination also may be performed.

If testing of the combination is to be performed, install process 608 initiates an installation of the software module with software modules 604 on a test computer such as test computer 614. Environment 616 on test computer 614 is a duplicate of environment 602 on client 600. Software modules 618 include software modules 604 from client 600 as well as the new software module selected for client 600. Test process 620 is used to monitor the software modules 618 on test computer 614. Test process 620 is an example of a test tool suite, such as test tool suite 404 in FIG. 4. Test process 620 monitors for heartbeat data generated by heartbeat process 622. The heartbeat monitored for by test process 620 is used for identifying newly installed products and re-testing existing products so that the knowledge database can be updated with new working or non-working combinations. This data is used to determine the compatibility of a combination of software modules 618 on test computer 614.

Additionally, heartbeat process 622 may be installed on different client machines to gather data on different combinations of software modules already present on those client machines. This data is sent back and stored in knowledge base 610. In this manner, data may be obtained regarding currently installed combinations to provide more data regarding compatibility of different combinations.

If the testing of software modules 618 is successful, then installation process 608 will install the new software module on client 600. On the other hand, if the testing is unsuccessful, install process 608 may search knowledge base 610 for a closest match to software modules 604. The closest match may require one or more modules currently in software modules 604 to be replaced to provide for compatibility with the new software module that has been selected to be combined with software modules 604. As described above, the new software module may be an additional software module to be added to software modules 604 or may be a new version of a software module replacing one of the software modules in software modules 604.

The user or administrator for client 600 is prompted with this option. If the closest match combination of software modules is desired, the change is then made on client 600. With this change, a compatible combination of software modules may be set up on client 600.

Figure 7:
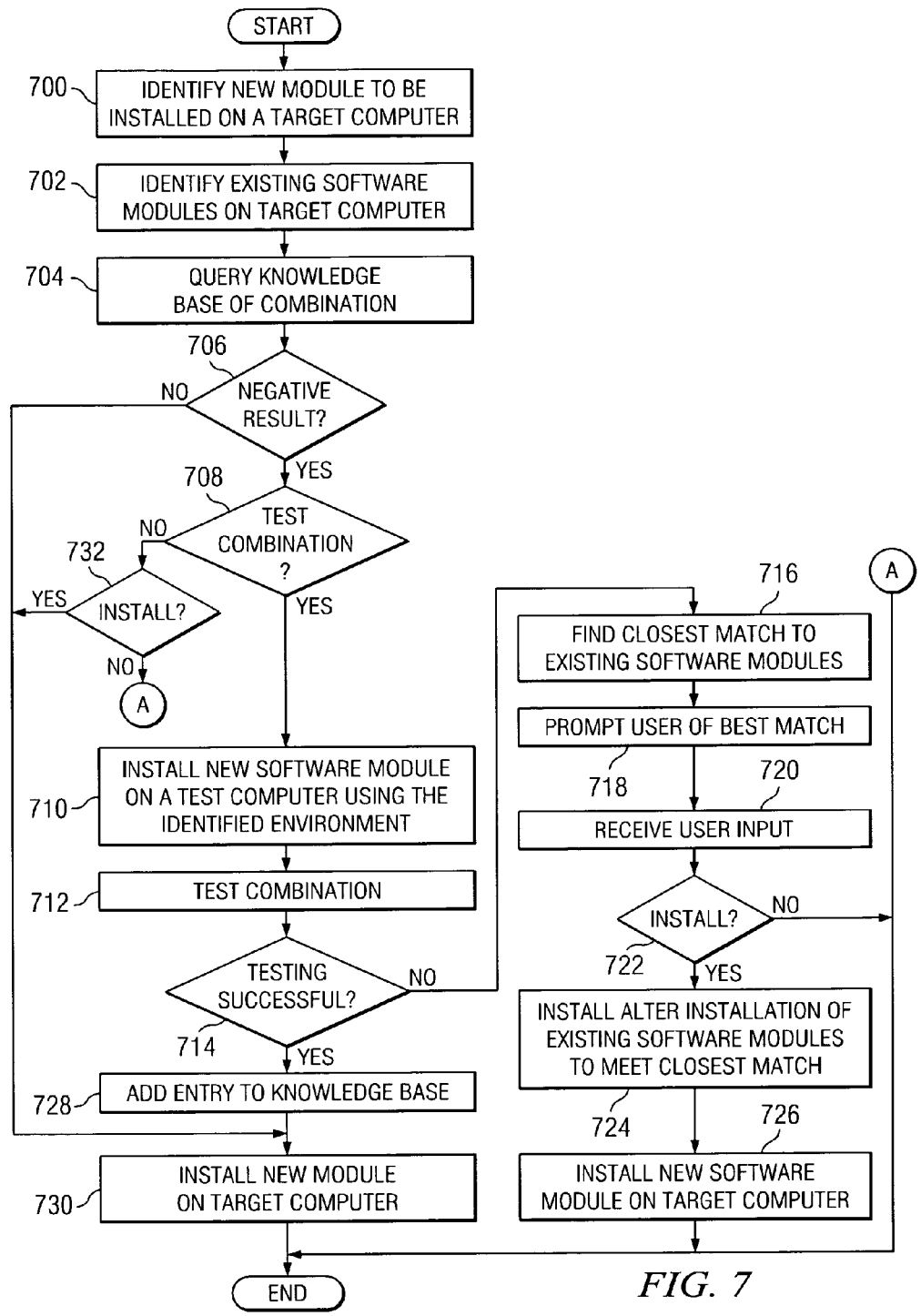
FIG. 7 is a flowchart of a process for installing a software module in accordance with a preferred embodiment of the present invention.

Turning next to FIG. 7, a flowchart of a process for installing a software module is depicted in accordance with a preferred embodiment of the present invention. The process illustrated in FIG. 7 may be implemented using a process such as install process 608 and test process 620 in FIG. 6.

The process begins by identifying a new software module to be installed on a target computer (step 700). Existing software modules are identified on the target computer (step 702). A query of a knowledge base is made for the combination of the software modules (step 704). This combination includes the software modules currently on the client as well as the new software module.

Next, a determination is made as to whether a negative result is returned for the combination (step 706). In these examples, a negative result may be a result in which the combination has failed on all installations. In addition, a negative result is considered to be present in these examples if data regarding the compatibility of the combination of software modules is absent. Further, a negative result may also include a situation in which some selected percentage of combinations is incompatible. For example, the result may state that 30 percent of the installations for the combination failed or caused errors.

If a negative result is returned, a determination is made whether to test the combination (step 708). This determination may be made through prompting the user or administrator as to whether a test of the combination is desired. For example, a prompt such as follows may be presented: "This combination has not been tried before, would you like to test the combination?" or "This combination has resulted in errors in 7 percent of the installations, would you like to test the combination?".

If the combination is to be tested, the environment for the client is identified and the new software module is installed on a test computer using the identified environment (step 710). Reproducing this environment includes setting up the same operating system as found on the client. Examples of parameters gathered to reproduce the environment include the operating system type, product names, version, and install locations. In addition, other settings, such as those for virtual memory or memory usage also are reproduced in replicating the environment of the client on the test computer. Thereafter, the combination of the software modules is tested (step 712).

The testing procedure in these examples employs a test suite to carry out a compatibility test. Test suites contain the basic test criteria, such as adding a user to the software application and modifying a user's role. These criteria are application specific. The output of each test in the test suite is a success or a failure. The entire test suite is run for the current install. Test output supports the "range" of answers given to a customer. Existing installs provide a pass/fail of a compatibility test during install may require upgrading components, such as an operating system. In this case, a message such as "Your machine operating system must be upgraded before continuing".

Test metrics such as performance ranges X amount of time on 10 of 12 systems. Test metrics can also include time of service. In this case, a message such as "This program has operated for an average of 11 months on 2000 systems." may be provided to the customer. Test cases may be scheduled to run on different days due to the large number of systems (tens of thousands). In this case it could take a long time to gather test data from all the system. Another range related answer provided by these tests to the customer may be, for example "Of 85 percent of the system reporting thus far, 99 percent have passed the xyz test".

After testing is complete, a determination is made as to whether the testing was successful (step 714). If the testing was not successful, a closest match to the existing software modules is identified in which the addition of the new software module results in a compatible combination (step 716). This match may require one or more existing software modules to be replaced to provide compatibility with the new software module. A prompt is made to the user indicating the best match (step 718). This prompt tells the user about the closest match and asks the user as to whether to make the needed changes. User input is received in response to the prompt (step 720).

A determination is then made as to whether the installation is to proceed (step 722). If installation is to proceed, the current installation of the existing software modules is altered to meet the closest match (step 724). This alteration includes removing one or more current software modules on the client and replacing it with one or more replacement software modules to meet the closest match to the configuration. Then, the new software module is installed on the target computer (step 726) with the process terminating thereafter.

With reference again to step 714, if the testing of the combination on the test computer is successful, an entry is added into the knowledge base for the test results (step 728). The new software module is then installed on the target computer (step 730) with the process terminating thereafter.

Turning back to step 708, if the combination is not to be tested, a determination is made as to whether to install the new software module (step 732). If the new software module is to be installed, the process proceeds to step 730 as described above. The process also proceeds to step 730 if a negative result is not received in step 706. In these examples, a positive result is received if the compatibility of the software modules in prior installations in the knowledge base is greater than some threshold. This threshold may vary depending on the particular implementation. In some cases, any incompatibility may result in a negative result instead of a positive result from the knowledge base.

Figure 8:
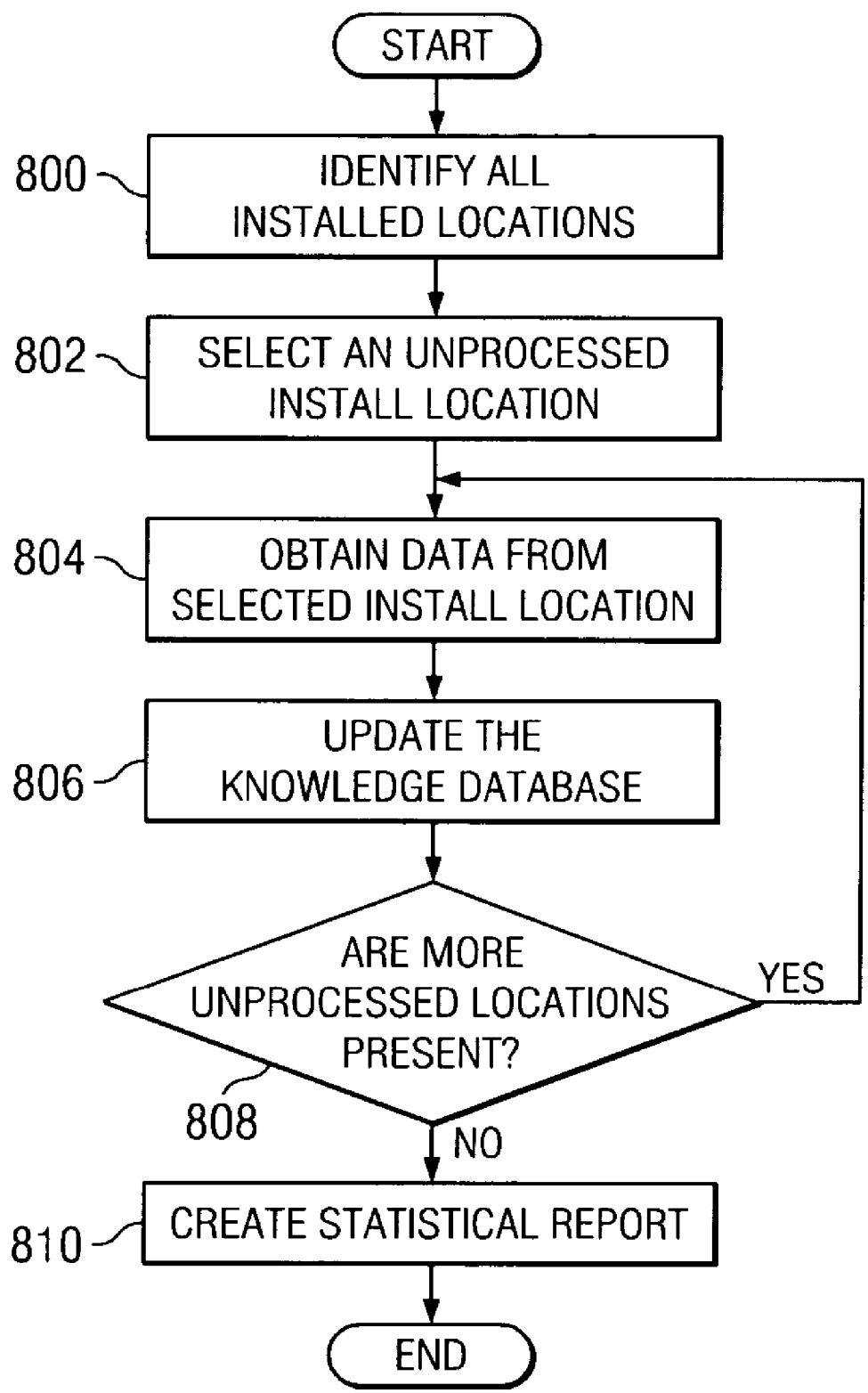
FIG. 8 is a flowchart of a process for obtaining installation compatibility data from installed locations in accordance with a preferred embodiment of the present invention.

Turning to FIG. 8, a flowchart of a process for obtaining installation compatibility data from installed locations is depicted in accordance with a preferred embodiment of the present invention. The process illustrated in FIG. 8 may be implemented in a process, such as test process 620 in FIG. 6.

The process begins by identifying all installed locations (step 800). An unprocessed install location is selected for processing (step 802). Data is then obtained from the selected install location (step 804). The data may be obtained through requests to one or more processes or agents on the install location in which these agents are used to collect data regarding compatibility of an installation.

Thereafter, a knowledge base is updated (step 806). A determination is then made as to whether additional unprocessed locations are present (step 808). If additional unprocessed locations are present, the process returns to step 804. Otherwise, a statistical report is created (step 810) with the process terminating thereafter.

Thus, the present invention provides an improved method, apparatus, and computer instructions for installing software combinations. The mechanism of the present invention allows for detecting when a new combination is being attempted. An install program identifies a new software module and queries a knowledge base as to the compatibility of the combination of the new software module with the existing software modules on the client or target computer. The mechanism of the present invention also allows for testing of the combination of the new software module with the existing software modules. The results of this testing is included in a repository of results in the knowledge base. This feature allows for the use of this result for other future installations. Further, monitoring of heartbeat processes may be placed on current installations of software modules to gather data on the compatibility of different combinations of software modules.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrated embodiments are directed toward installation of a single new software module. The mechanism of the present invention also may be applied to the installation of multiple new software modules. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for testing a compatibility of software modules, the method comprising computer implemented steps of:
   responsive to receiving a request to install a new software module in a data processing system, performing an inventory on an existing set of software modules resident in the data processing system;
   referring to a knowledge base of software modules to determine whether the new software module is known to function compatibly with each software module in the existing set of software modules;
   responsive to a determination that the new software module is not known to function compatibly with each software module in the existing set of software modules, determining whether to test the new software module in a test data processing system in combination with the existing set of software modules;
   responsive to a determination to test the new software module in the test data processing system in combination with the existing set of software modules, identifying an operating environment of the data processing system;
   installing the new software module, the identified environment, and the existing set of software modules on the test data processing system;
   testing the new software module in combination with the existing set of software modules on the test data processing system;
   responsive to a test result indicating that the new software module is compatible with the existing set of software modules, adding a new combination indicating the compatibility to the knowledge base; and
   installing the new software module, which has been tested and is compatible with the existing set of software modules, in the data processing system.

2. The method of claim 1, wherein determining whether to test the new software module in a test data processing system in combination with the existing set of software modules comprises:
   prompting a user for a selected input.

3. The method of claim 2, further comprising:
   receiving a first selected input from the user that indicates installing the new software module in the data processing system.

4. The method of claim 1, further comprising:
   responsive to a determination that the new software module is not compatible with each software module in the existing set of software modules, adding a new combination indicating the incompatibility to the knowledge base;
   notifying the user that the new software module is not compatible with the existing set of software modules; and
   prompting the user for an input.

5. The method of claim 4, wherein the input indicates one of installing the new software module in the data processing system and not installing the new software module in the data processing system.

6. The method of claim 1, further comprising:
   responsive to a determination that the new software module is not compatible with each module in the existing set of software modules, adding a new combination indicating the incompatibility to the knowledge base and searching the knowledge base to find a closest match, wherein at least one of the existing modules is removed or replaced with a different version;
   prompting for the user as to availability of the closest match combination; and
   responsive to a user input, installing the new software module and changing the existing set of modules as needed to obtain a compatible combination.

7. An apparatus for testing a compatibility of software versions, the apparatus comprising:
   a bus;
   a storage device connected to the bus, wherein the storage device contains a computer usable program product, and wherein the computer usable program product contains a plurality of instructions; and a processor unit connected to the bus, wherein the plurality of instructions causes the processor unit to perform steps comprising:

responsive to receiving a request to install a new software module in a data processing system, performing an inventory on an existing set of software modules resident in the data processing system;

referring to a knowledge base of software modules to determine whether the new software module is known to function compatibly with each software module in the existing set of software modules;

responsive to a determination that the new software module is not known to function compatibly with each software module in the existing set of software modules, determining whether to test the new software module in a test data processing system in combination with the existing set of software modules;

responsive to a determination to test the new software module in the test data processing system in combination with the existing set of software modules, identifying an operating environment of the data processing system;

installing the new software module, the identified environment, and the existing set of software modules on the test data processing system;

testing the new software module in combination with the existing set of software modules on the test data processing system;

responsive to a test result indicating that the new software module is compatible with the existing set of software modules, adding a new combination indicating the compatibility to the knowledge base; and installing the new software module, which has been tested and is compatible with the existing set of software modules, in the data processing system.

8. The apparatus of claim 7, wherein determining whether to test the new software module in a test data processing system in combination with the existing set of software modules comprises:

prompting a user for a selected input.

9. The apparatus of claim 8, wherein the plurality of instructions further causes the processor unit to perform steps comprising:

receiving a first selected input from the user that indicates installing the new software module in the data processing system.

10. The apparatus of claim 7, wherein the plurality of instructions further causes the processor unit to perform steps comprising:

responsive to a determination that the new software module is not compatible with each software module in the existing set of software modules, adding a new combination indicating the incompatibility to the knowledge base;

notifying the user that the new software module is not compatible with the existing set of software modules; and prompting the user for an input.

11. The apparatus of claim 10, wherein the input indicates one of installing the new software module in the data processing system and not installing the new software module in the data processing system.

12. The apparatus of claim 7, wherein the plurality of instructions further causes the processor unit to perform steps comprising:

responsive to a determination that the new software module is not compatible with each module in the existing set of software modules, adding a new combination indicating the incompatibility to the knowledge base and searching the knowledge base to find a closest match, wherein at least one of the existing modules is removed or replaced with a different version;

prompting for the user as to availability of the closest match combination; and responsive to a user input, installing the new software module and changing the existing set of modules as needed to obtain a compatible combination.

13. A computer program product comprising:

a computer readable storage medium having a computer usable program code for testing a compatibility of a software modules, the computer usable program code causing the computer to perform steps comprising:

responsive to receiving a request to install a new software module in a data processing system, performing an inventory on an existing set of software modules resident in the data processing system;

referring to a knowledge base of software modules to determine whether the new software module is known to function compatibly with each software module in the existing set of software modules;

responsive to a determination that the new software module is not known to function compatibly with each software module in the existing set of software modules, determining whether to test the new software module in a test data processing system in combination with the existing set of software modules;

responsive to a determination to test the new software module in the test data processing system in combination with the existing set of software modules, identifying an operating environment of the data processing system;

installing the new software module, the identified environment, and the existing set of software modules on the test data processing system;

testing the new software module in combination with the existing set of software modules on the test data processing system;

responsive to a test result indicating that the new software module is compatible with the existing set of software modules, adding a new combination indicating the compatibility to the knowledge base; and installing the new software module, which has been tested and is compatible with the existing set of software modules, in the data processing system.

14. The computer program product of claim 13, wherein determining whether to test the new software module in a test data processing system in combination with the existing set of software modules comprises:

prompting a user for a selected input.

15. The computer program product of claim 14, wherein the computer usable program code further causes the computer to perform steps comprising:

receiving a first selected input from the user that indicates installing the new software module in the data processing system.

16. The computer program product of claim 13, wherein the computer usable program code further causes the computer to perform steps comprising:

responsive to a determination that the new software module is not compatible with each software module in the existing set of software modules, adding a new combination indicating the incompatibility to the knowledge base;

notifying the user that the new software module is not compatible with the existing set of software modules; and prompting the user for an input.

17. The computer program product of claim 16, wherein the input indicates one of installing the new software module in the data processing system and not installing the new software module in the data processing system.

18. The computer program product of claim 13, wherein the computer usable program code further causes the computer to perform steps comprising:

responsive to a determination that the new software module is not compatible with each module in the existing set of software modules, adding a new combination indicating the incompatibility to the knowledge base and searching the knowledge base to find a closest match, wherein at least one of the existing modules is removed or replaced with a different version;

prompting for the user as to availability of the closest match combination; and responsive to a user input, installing the new software module and changing the existing set of modules as needed to obtain a compatible combination.

* * * * *